United States Patent [19]

Leshik

[11] 4,072,992
[45] Feb. 7, 1978

[54] CONTINUOUS LOOP TAPE CARTRIDGES

[76] Inventor: Edward Alexander Leshik, 122 Princess Court, Queensway, London W2, England

[21] Appl. No.: 734,730

[22] Filed: Oct. 22, 1976

[30] Foreign Application Priority Data

Oct. 28, 1975 United Kingdom ............... 44415/75

[51] Int. Cl.² ........................................... G11B 23/10
[52] U.S. Cl. ...................................... 360/94; 360/132
[58] Field of Search .................... 360/94, 85, 93, 132; 179/100.11; 242/55.19 A, 197-200

[56] References Cited

U.S. PATENT DOCUMENTS

| Re. 29,058 | 11/1976 | Bolick, Jr. ............................ 360/94 |
| 3,632,894 | 1/1972 | Bretschneider ................. 179/100.11 |
| 3,644,684 | 2/1972 | Tsuji ................................ 179/100.11 |
| 3,777,073 | 12/1973 | Kokubo ................................. 360/94 |
| 3,821,808 | 6/1974 | Wada et al. ............................ 360/94 |
| 3,849,798 | 11/1974 | Ono ........................................ 360/94 |
| 3,950,785 | 4/1976 | Findley ................................... 360/94 |
| 3,963,189 | 6/1976 | Sharp ............................. 242/55.19 A |
| 3,966,134 | 6/1976 | Matsuda ........................ 242/55.19 A |

Primary Examiner—John H. Wolff
Attorney, Agent, or Firm—Lawrence E. Laubscher

[57] ABSTRACT

A miniature tape module, in the form of a continuous-loop tape cartridge, is engageable with an adaptor so that the cartridge/adaptor composite may be received by a conventional type of cassette player for playing back a programme recorded on tape of the miniature cartridge. Whereas the cassette normally intended for this conventional player has a total playing time of some 45 minutes, and is thus equivalent to a long playing record disc, the miniature cartridge has a playing time of some 6 minutes and is thus equivalent to a singles record disc.

14 Claims, 9 Drawing Figures

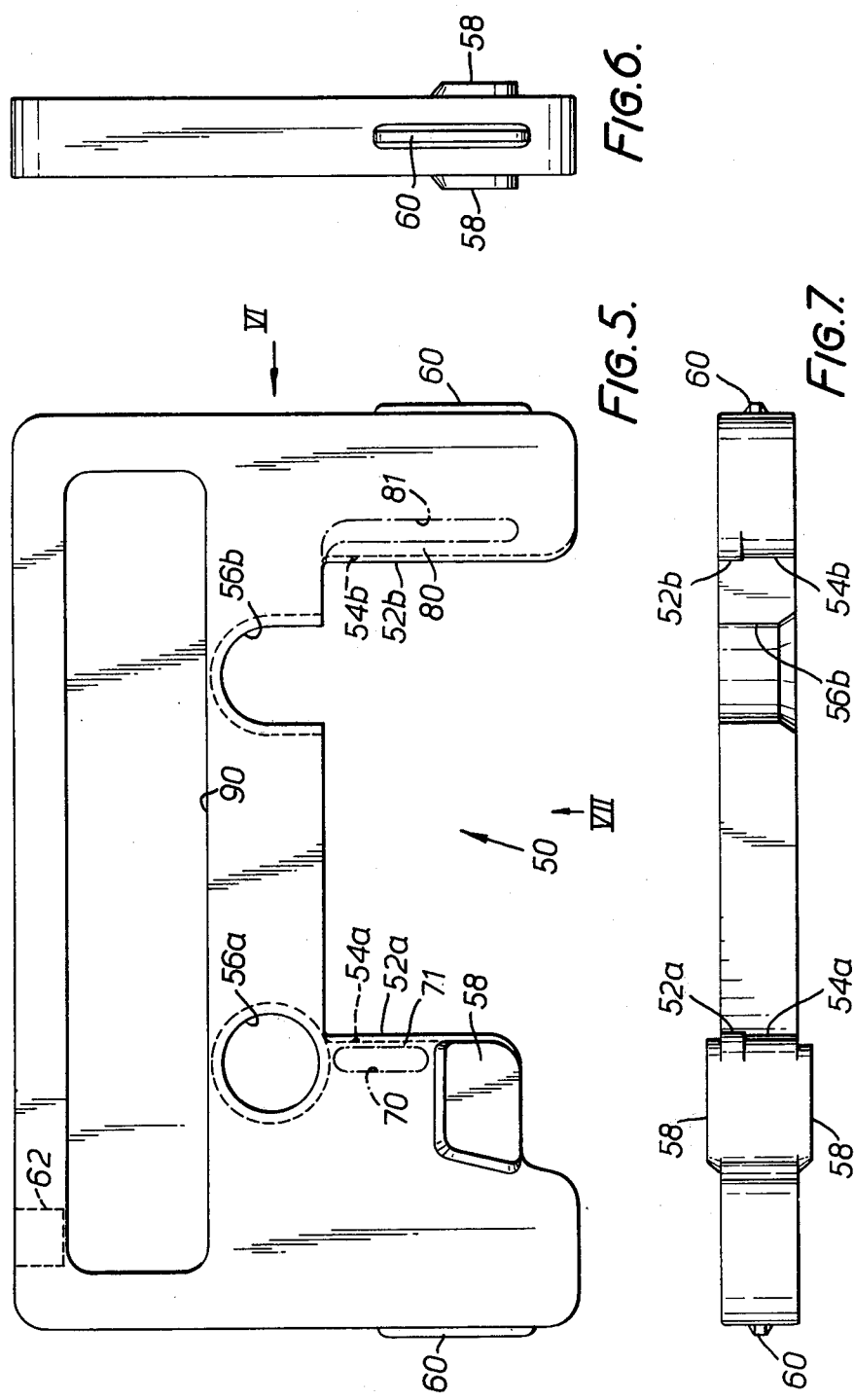

CONTINUOUS LOOP TAPE CARTRIDGES

BRIEF DESCRIPTION OF THE PRIOR ART

This invention relates to a miniature tape module, for example a miniature tape cartridge, and to an adaptor with which the miniature tape module is engageable so that the module can be played on a conventional type of cassette player.

In the following specification, the term "cassette" refers to a recording device having a length of tape which is movable back and forth between a pair of reels or spools, and the term "cartridge" relates to a recording device having a continuous loop of tape.

This conventional type of cassette player is designed to receive and playback a known tape cassette as defined by British Standards Specification BS 1568, which has considerably larger dimensions than the miniature tape module to which this invention relates.

The conventional type of tape cassette player and the associated tape cassette are well known and in widespread use throughout the world. The tape cassette comprises two rotatable hubs to which the opposite ends of the tape are secured and in use the tape is wound from one hub to the other along a path closely adjacent one longitudinal edge or front edge of the cassette. The cassette may be placed in the player with one or other of its major surfaces uppermost, or in other words it is reversible, and the tape is provided with two pairs of tracks: one pair of tracks provides one programme which is played when the cassette has one major face uppermost for the tape to be wound from a first hub to the second hub and the other pair of tracks provides a second programme which is played when the cassette has its other major face uppermost and the tape is wound from the second hub to the first hub. The cassette includes a window in the center of its front longitudinal edge, for access of a magnetic head of the player. Further windows are also provided in this front edge, one either side of the central window, for access (through one or other such window according to which way up the cassette is being used) of a pinch wheel of the player. Furthermore, an aperture is formed right through the cassette, (from one major face to the other major face) adjacent each pinch wheel window, for the access of a tape drive capstan of the player: the position of the tape drive capstan is such that in use the pinch wheel presses the tape against such capstan.

The cassette is dimensioned overall so as to fit snugly within a recess on the tape deck of the player and for this purpose its major faces are provided with reference planes and also each major face is provided with a pair of reference apertures, adjacent the windowed front edge of the cassette, for locating with reference bosses which project from the tape deck of the player. The player itself includes the aforementioned recessed tape deck from which the aforementioned reference bosses and tape drive capstan and also two hub drive spindles project. As the cassette is lowered onto the deck the drive spindles engage within through-bores in the cassette tape hubs and the tape drive capstan enters the cassette through the appropriate aperture. At the same time, the reference apertures of the cassette engage the reference bosses of the player. Usually, the player is such that the cassette is placed manually upon the tape deck but sometimes the player includes a cassette carrier into which the cassette is slidably located, with its windowed edge projecting, and the carrier is pivoted to the tape deck along its opposite edge: upon pivoting (against a spring bias) the cassette is lowered to the deck and the hub drive spindles engage the cassette tape hubs and the capstan enters the appropriate aperture of the cassette. The carrier latches in the closed position. In order to play the tape, a bridge (including a magnetic head and a pinch wheel) of the player is advanced towards the windowed edge of the cassette for the magnetic head to enter the centre window and the pinch wheel to enter the appropriate one of the two other windows to press the tape against the drive capstan. At the same time the drive is energized to the capstan and also to the hub drive spindle of the hub onto which the tape is to be wound. For fast forward or reverse winding of the tape, the drive is energized to both hub drive spindles. The player may be used not only for play-back but also for recording upon the cassette.

As a definition, the conventional type of cassette player comprises a cassette deck from which project two reference bosses for engaging the reference apertures of the conventional cassette, two drive spindles for engaging the two rotatable hubs of the conventional cassette and a drive capstan, and the player further comprises a sensing head and a pinch wheel movable to gain access to the tape of the cassette through windows in a front edge of the latter, the pinch wheel being positioned to press the tape onto the drive capstan. Such a player will be referred to as a player of the type hereinbefore defined.

The conventional pre-recorded cassette has a playing time typically of some twenty two and a half minutes for each of its two tracks, giving a total playing time of 45 minutes. The playing time is therefore approximately equal to that of a long player record disc.

The conventional cassette has certain advantages over its equivalent record disc, such as being easier to use and being such that it may be played whilst the player is moving or liable to movement. However, use of the conventional cassette as an equivalent of a singles record disc (i.e. with a 6 minutes playing time) would be uneconomic, in that it would be much more expensive than its equivalent singles disc. Prior to this invention, there is no tape module (i.e. cartridge or cassette) equivalent to a singles disc and comparable in cost, which can be used on the universal cassette player.

BRIEF DESCRIPTION OF THE DRAWING

This invention provides a miniature tape module which is engageable with an adaptor so that the module/adaptor may be received by the conventional type of cassette player for playing back a programme recorded on tape of the module. The tape module, because of its size, may be manufactured at prices comparable with those of the singles disc. The adaptor may be a simple and cheap plastics moulding and moreover may be re-used for different tape cartridges. The invention has the particular advantage that it provides a tape cartridge, comparable in playing time and cost to a singles disc, which may be played in a simple manner on a conventional player which is already in widespread use throughout the world.

An embodiment of the invention will now be described by way of example only, with reference to the accompanying drawings, in which:

FIG. 5 is a plan view of an adaptor for use with the tape module of FIG. 3;

FIG. 6 is an end view taken in the direction of arrow VI of FIG. 5;

FIG. 7 is an edge view taken in direction of arrow VII of FIG. 5.

DETAILED DESCRIPTION

Figure 1:
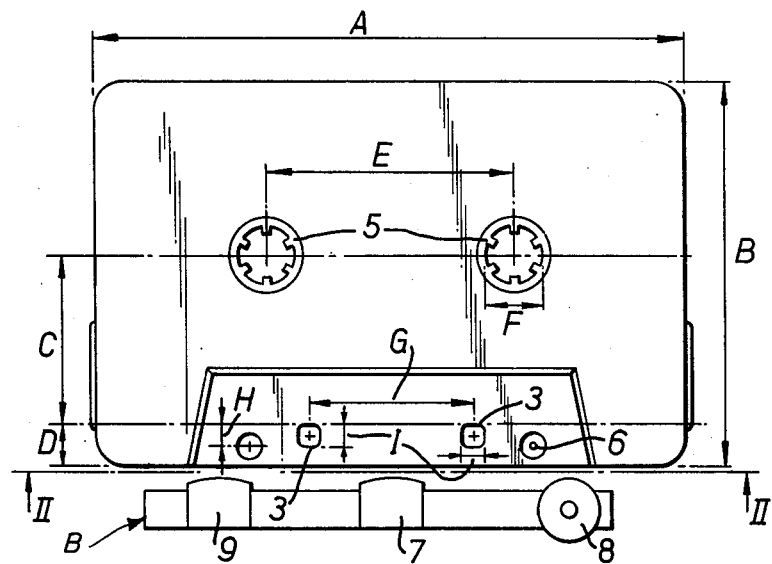
FIG. 1 is a plan view of a conventional cassette being lowered onto a tape deck of a conventional player.
Figure 2:
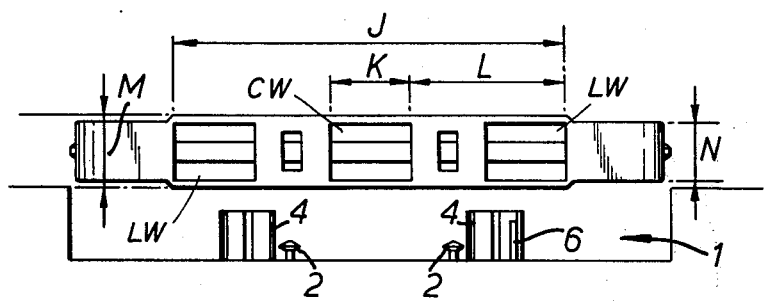
FIG. 2 is a section on the line II — II of FIG. 1.

Reference will first be made to FIGS. 1 and 2, which show the cassette of the prior art defined by BS 1568 being lowered onto a tape deck of the conventional player, the Figures being diagrammatic to show essential details only. The player includes a tape deck 1 from which project two reference bosses 2 for engaging reference apertures 3 in the conventional cassette, two drive spindles 4 for engaging the two rotatable hubs 5 of the cassette and a drive capstan 6. The player further comprises a bridge, B shown in its retracted position, carrying a sensing head 7, a pinch wheel 8, and an erase head 9. The cassette has two reference apertures 3 on each of its major surfaces and has two through-apertures for the drive capstan. In its front edge, the cassette has a central window CW for the sensing head and two equally dimensional and symmetrically disposed lateral windows LW for the erase head and pinch wheel, respectively.

Some of the essential dimensions of the conventional cassette are given below, with reference to FIGS. 1 and 2, and these dimensions are given because the tape module and adaptor shown in FIGS. 3 to 7 are required to be compatible with these dimensions if the adaptor, with module engaged therewith, is to be received by the conventional player:

| A | 100.4 | mm | H | 3.4 | mm |
|---|---|---|---|---|---|
| B | 63.8 | mm | I | 4.0 | mm |
| C | 27.9 | mm | J | 67.0 | mm |
| D | 6.9 | mm | K | 14.0 | mm |
| E | 42.5 | mm | L | 27.0 | mm |
| F | 10.0 | mm | M | 12.0 | mm |
| G | 28.0 | mm | N | 9.8 | mm |

Diameter of aperture for capstan drive spindle: 9.0 mm

Figure 4:
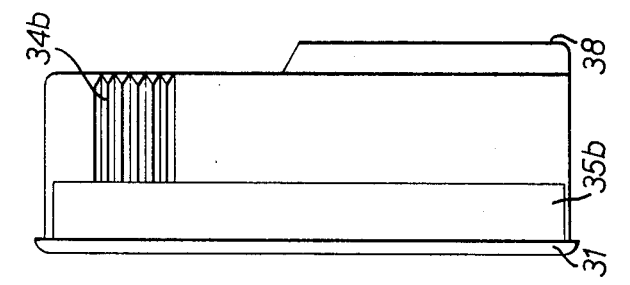
FIG. 4 is an end view taken in the direction of arrow IV of FIG. 3.
Figure 3:
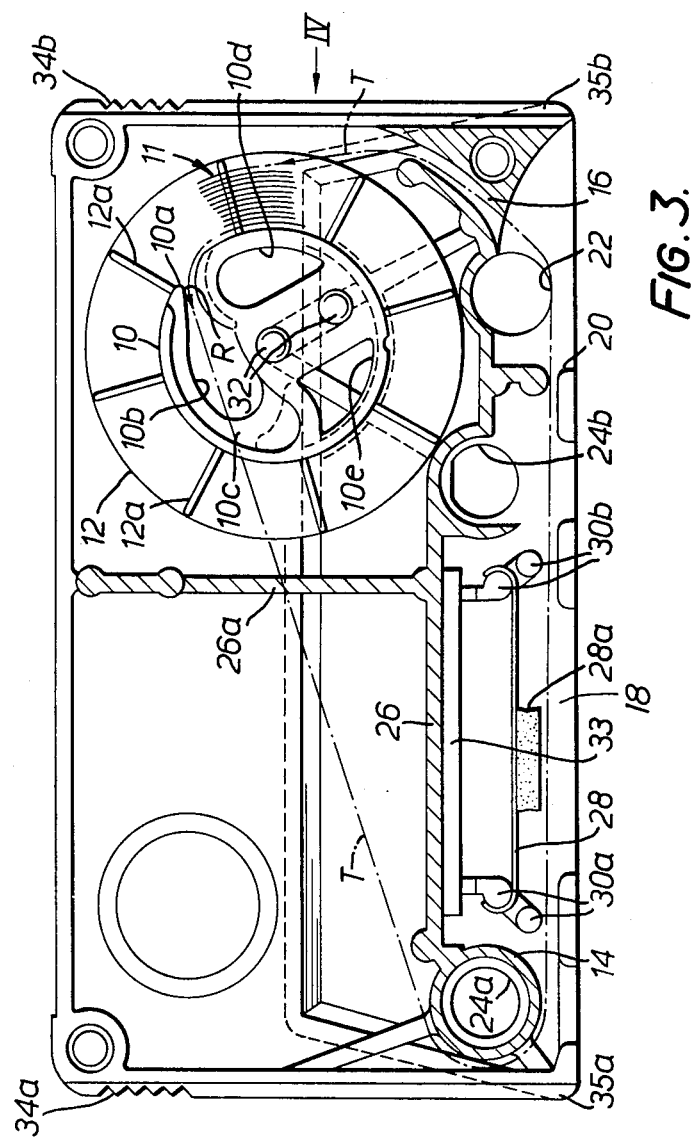
FIG. 3 is a plan view of a tape module, shown with the lid thereof removed in order to show the internal details of the module.

Referring now to FIGS. 3 and 4, there is shown a miniature tape module, in the form of a continuous loop tape cartridge, in accordance with the invention, and referring to FIGS. 5, 6 and 7 there is shown an adaptor in accordance with the invention. The tape cartridge is slidably engageable with the adapter to form a composite assembly which is compatible with the conventional cassette, in the sense that it is receivable upon the tape deck of the conventional player, for play-back of a programme recorded on the tape of the miniature cartridge or for recording a programme onto the tape of that cartridge.

Referring in more detail to FIG. 3, the path for the magnetic tape is shown by the chain-dotted line T but for clarity in the drawing only part of the actual tape is shown, namely at 11. The cartridge comprises a rectangular shell having a base wall and a peripheral wall, the peripheral wall being continuous apart from some apertures or windows disposed in a front edge of the cartridge, which apertures will be described later in this specification. The cartridge comprises a stationary hub having a cylindrical surface 10, around which a pack 11 of tape is wound. The hub further comprises an integral annular flange 12, with radial ribs 12a on its upper surface. The flange 12 is circular as shown, but may instead by generally square, conforming to the shape and size of the compartment in which it is fitted to provide the maximum size for the pack of tape. The cylindrical surface 10 is provided with a slot 10a, which is shown inclined in the vertical plane, through which the tape leads from the innermost turn of the pack in the direction of arrow R. Slot 10a leads into a recess 10b within which the tape twists through an angle up to but not exceeding 90° in order to pass over the top of the hub at 10c and also to pass over the pack of tape. A running surface is provided at 26a for the tape to run over in a horizontal or nearly horizontal plane at this point and preferably this running surface is positioned sufficiently high above the base wall of the cartridge so that the tape passes over the hub and tape pack without touching them. Preferably the tape twists through less than 90° in passing from the innermost turn of the pack to the running surface 26a and preferably the running surface 26a is inclined to correspond to the disposition of the tape at this point. The hub is further provided with through-apertures at 10d, 10e to minimize the weight of the hub and the amount of material used in its manufacture.

The cartridge further comprises a cylindrical tubular boss 14 around which the tape runs, having twisted to return to a vertical plane in passing from the running surface 26a to the boss 14. The cartridge also includes a curved channel 16 through which the tape runs to return to the tape pack as the outermost turn. In running from the boss 14 to the entry of channel 16, the tape follows a path closely adjacent the front edge of the cartridge. The channel 16 is carefully disposed and profiled to ensure that the tape follows its natural curve from a drive capstan of the player, the capstan entering the cartridge through an aperture 22 on the base wall of the cartridge. Also the channel 16 is positioned and profiled to ensure that the tape will always be positioned closer to the front edge of the cartridge than the front edge of the aperture 22, so that the capstan will always enter the cartridge on the correct side of the tape.

The front edge of the cartridge includes a window 18 for access to the tape of the magnetic head of the player, and a window 20 for the pinch wheel of the player. The base wall of the cartridge is provided with apertures 24a, 24b to locate with the reference bosses of the player and is provided with a flat area within the cartridge around the periphery of each of these apertures. The reference bosses on the player include enlarged heads and the player includes a spring bias which urges the cartridge forward for these flat areas of the base wall to engage under the enlarged heads of the reference bosses.

The cartridge includes internal walls 26 (shown hatched) which extend from the base wall but terminate a short distance from the top of the peripheral wall of the cartridge. These internal walls 26 act as dust traps and the running surface 26a is formed on the top edge of the appropriate such wall. A metal spring 28, carrying a pad 28a of cellular synthetic plastic material, is engaged between spaced pairs of posts 30a and 30b: the magnetic head of the player presses the tape against this pad in use of the cartridge. A shield 33 of high magnetic impermeability is provided on the front surface of the dust wall 26 and the pad 28a may be secured to this shield in which case the metal spring 28 is dispensed with.

The cartridge is formed as a one-piece moulding of synthetic plastic material, apart from the lid of the cartridge (shown by reference numeral 31 in FIG. 4), the spring and pad 28 and 28a, the shield 31 and the hub 10 with integral flange 12. The lid 31 is another one-piece moulding, and the hub 10 with integral flange 12 is a further one-piece moulding. In manufacture, the hub is loaded with the tape in an automatic process which ends with the tape ends spliced together and the tape held out in the configuration which it is to have in the cartridge: then the tape and hub are lowered into the cartridge. This process is described in my U.S. application Ser. No. 618,286 filed Sept. 30, 1975 (now U.S. Letters Pat. No. 4,034,927 of July 12, 1977). The hub engages with the cartridge by means of two pegs 32 on the cartridge base wall engaging complementary bores in the hub.

Referring to FIG. 4, the base wall includes a lowered area 38 in which the apertures 22, 24a and 24b are formed and this lowered wall section acts as the reference plane for proper location of the cartridge upon the tape deck of the player.

Serrated finger grips 34a, 34b will be noted on the opposite end edges of the cartridge towards the back thereof also provided on the opposite end edges are respective grooves 35a, 35b for use, as will be described, in engaging with the adaptor.

Referring now to FIGS. 5 to 7, the adaptor is a one piece moulding of synthetic plastic material (for example foamed styrene for lightness and rigidity at reasonable cost) and is generally rectangular in plan view shape (see FIG. 5) apart from a cut-out 50 to receive the cartridge of FIGS. 3 and 4, and the adaptor corresponds in general shape and size to the conventional cassette as defined in BS 1568. The recess 50 is provided on opposite edges with ribs 52a, 52b which engage the slots 35a, 35b on the opposite end edges of the cartridge, so that the cartridge can be slid into the recess 50 of the adaptor. Vertical ribs 54a, 54b are also provided on the opposite edges of the recess 50 to engage the end one of the finger grips of the series 34a, 34b on the cartridge, providing a final snapengagement of the cartridge with the adaptor. The adaptor further comprises through-apertures 56a, 56b (the latter of which runs into the recess 50) to accommodate the drive spindles of the player. The adaptor is formed at 58 with a projecting surface on opposite sides thereof, completing the reference planes of the cartridge-adaptor composite when these are fitted together. Ribs 60 on outer opposite side edges of the adaptor are provided for engagement with a pivoted carrier, where this is provided in the conventional player. The adaptor which is shown is formed with a recess 62 in its rear edge to accommodate the "erase" lever on the conventional player so that the adaptor will not depress this lever when used on the player. Accordingly, there is no risk with this adaptor that the erasing system of the player would be energized whilst a pre-recorded miniature tape cartridge is being used.

In one modification, the adaptor may be formed without the recess so that cartridges with blank tapes can be used for recording upon. In another modification the adaptor may be formed with a recess which is covered by a lug which can be broken off: when left on the lug will operate the "erase" lever but when the lug is broken off the recess accommodates the "erase" lever without depressing the latter.

The material of which the adaptor is made may itself provide some resilience for gripping the cartridge but additional resilience may be provided by appropriate profiling of the adaptor. For example, as shown in chain-dotted outline at 70, an aperture may be formed through the adaptor, leaving a thin wall 71, adjacent one end edge of the cartridge, which has a degree of resilience for gripping the cartridge. As another example, as shown in chain-dotted outline at 80, a pivoted bridge portion may be formed by providing a cut-out 81. A recess for an identification label is formed on the top surface of the adaptor at 90.

Figure 8:
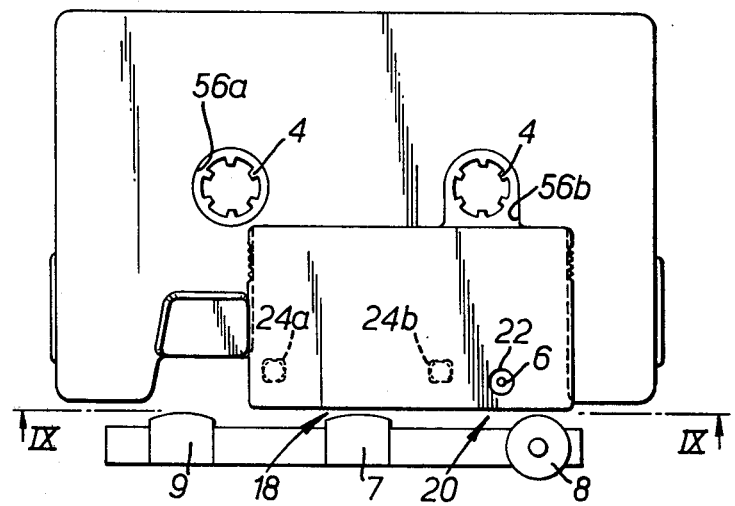
FIG. 8 is a plan view similar to FIG. 1 illustrating the tape module/adapter of the present invention lowered onto the tape deck of a conventional player.
Figure 9:
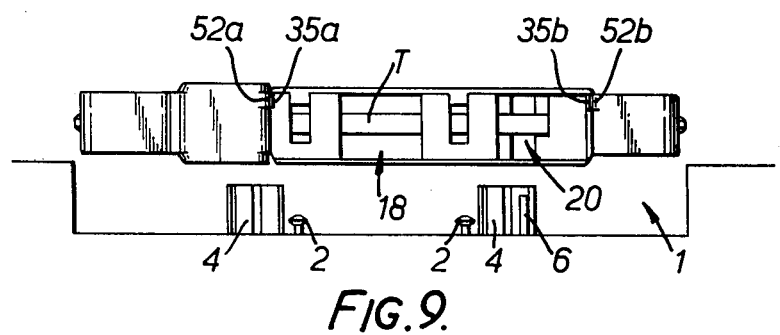
FIG. 9 is a sectional view taken along line IX—IX of FIG. 8.

The weight of the adaptor may be decreased advantageously by providing apertures which extend fully through the adaptor from its upper surface to its lower surface, or only partly through the adaptor from its upper or lower surface. Referring to FIGS. 8 and 9, the tape module of FIGS. 3 and 4 is shown engaged within the cut-out 50 of the adaptor of FIGS. 5 – 7, the ribs 52a, 52b of the adaptor being engaged within the grooves 35a, 35b of the module (as a result of relative sliding movement). It will be seen that as the module/adaptor combination is lowered onto the deck 1 of the conventional cassette player, the drive spindles 4 of the player locate freely in the adaptor recesses 56a, 56b: also, the reference bosses of the player engage the recesses 24a, 24b of the tape module to locate the latter precisely. The player capstan enters the aperture 22 of the module housing, behind the tape path. When operation of the player is initiated, the player bridge moves forwardly for the sensing head 7 thereof to enter the window 18 of the module to co-operate with the tape: also the pinch wheel 8 enters the window 20 to press the tape against the capstan, to which drive is now commenced in order to drive the tape. Whereas for playing the conventional cassette, normal forward drive of the tape is assisted by the relevant one (right hand) drive spindle 4, this is not necessary with the miniature module because less force is needed to drive the smaller length of tape. Whereas for playing the conventional cassette, the drive spindles 4 effect fast forward and fast reverse drive of the tape when required, and the erase head 9 is effective for erasure if required, these facilities are not available when playing the miniature module: however, these facilities are not particularly required (the fast movements are not required because of the short playing time of the tape module).

In use, the cartridge is engaged with the adaptor recess 50 by a sliding movement. Preferably the arrangement is such that the cartridge can only be slid the correct way up into the adaptor recess 50: for example, the ribs 52a, 52b of the adaptor may be of different sizes, cross-sectional shapes or at different heights (relative to the thickness of the adaptor) to engage complementary grooves in the end edges of the cartridges. Then the adaptor-cartridge composite is lowered onto the tape deck of the player. The drive spindles on the player enter the apertures 56a, 56b of the adaptor but do not engage the adaptor nor the cartridge and in use serve no function. The capstan enters the aperture 22 of the cartridge base wall and the reference bosses of the player enter the reference apertures 24a, 24b of the cartridge to locate the tape cartridge relative to the tape deck. In order to play the tape, the bridge of the player is advanced for the magnetic head carried on the bridge to enter the window 18 of the cartridge and for the pinch wheel, also mounted on the bridge, to enter the window 20 and press the tape against the capstan. The capstan drives the tape continuously, drawing the tape from the tape pack (specifically from the innermost turn of the pack) past the magnetic head and then returning the same to the pack as the outermost turn.

The cartridge will be played continuously until the bridge of the player is retracted, whereupon the carrier can be pivoted up to remove the adaptor-cartridge composite.

Typically, the cartridge has a maximum playing time of approximately 6 minutes on a single track, which is approximately equivalent to both sides of an ordinary "singles" record disc. As will be appreciated, the cartridge is unlike the conventional cassette in that it is not reversible. There is no facility, when using the cartridge on conventional players, for reverse or fast forward winding of the tape, but this is considered unnecessary with the small overall playing time concerned.

It will be noted that the dust wall 26, apart from the region to the right of the channel 16, is approximately 2 mm lower than the peripheral wall of the cartridge.

I claim:

1. An adaptor and miniature tape module assembly adapted for use with a tape recording and/or play-back apparatus of the cassette type having reference boss means (2) for locating a magnetic tape cassette on a support surface of the apparatus, parallel spaced capstan (6) and pinch wheel means (8) arranged normal to said support surface for transporting the cassette tape along a given path relative to said support surface, sensing head means (7) arranged adjacent said given tape path, and a pair of parallel spaced drive spindles (4) arranged parallel to said support surface, said adaptor and miniature tape module assembly comprising
   (a) an adaptor member having bottom, top, side and end wall surfaces, one of said side wall surfaces containing a recess (50);
   (b) a hollow tape module housing having bottom, side and end walls, means for removably mounting said tape module housing in said recess with one of its side walls coincident with the said one side wall of said adaptor member, thereby to define an adaptor member and tape module assembly, the bottom wall of said module housing containing first apertures (24a, 24b) for receiving the reference boss means of the apparatus, said adaptor member containing second apertures (56a, 56b) for freely receiving in concentrically spaced relation the drive spindles of the apparatus; and
   (c) a length of tape (11) mounted in said tape module housing, said tape module including guide means (14, 16) for guiding said tape along a path parallel with and adjacent the inner surface of said one housing side wall;
   (d) the bottom wall of said tape module housing containing a capstan aperture (22) on the side of said tape path remote from said one housing side wall, said aperture being adapted to receive the drive capstan of the apparatus;
   (e) the said one side wall of said housing containing a pinch wheel opening (20) adjacent said capstan opening, whereby the tape may be gripped between the pinch wheel and the drive capstan, the said one side wall of said housing also containing a sensing head opening (18) adjacent said tape path for receiving the sensing head during tape recording or play-back operation of the apparatus.

2. Apparatus as defined in claim 1, and further wherein the end walls of said tape module housing and the adjacent opposed walls of said recess include complementary guide means (52a, 52b; 35a, 35b) slidably guiding said housing for introduction into, and removal from, said recess in a direction normal to the said one side wall of said housing.

3. Apparatus as defined in claim 2, wherein said complementary guide means include rib and groove means.

4. Apparatus as defined in claim 2, and further including complementary locking rib and groove means (34a, 34b; 54a, 54b) arranged normal to said complementary guide means for retaining said housing in a fully introduced position relative to said recess.

5. Apparatus as defined in claim 1, wherein said housing includes a stationary hub (10) arranged with its axis generally normal to the bottom wall of said housing, said hub containing a central recess, and an axial slot (10a) extending radially inwardly to said recess, said tape being wound as a coiled pack around said hub, the tape from the innermost turn of said tape pack extending successively through said slot, across one end of said hub and pack at a point diametrically opposite said slot, around said guide means along said path adjacent the inner surface of said one housing wall, and returning to the pack as the outermost turn thereof, whereby the tape comprises a continuous loop.

6. Apparatus as defined in claim 5, wherein said tape guide means includes a tubular boss (14) around a portion of the outer surface of which the tape is guided along said given tape path.

7. Apparatus as defined in claim 5, wherein said tape guide means includes a narrow arcuate channel (16) contained in said housing for guiding the tape as it returns as the outer turn of the tape pack.

8. Apparatus as defined in claim 1, wherein said tape module housing comprises a one-piece body formed of a molded synthetic plastic material, and further including a generally flat lid member (31) formed of molded synthetic plastic material for closing the top of said housing body.

9. Apparatus as defined in claim 1, wherein said adaptor member has a generally flat rectangular configuration, said recess being generally rectangular.

10. Apparatus as defined in claim 9, wherein said adaptor member is a one-piece body molded from synthetic plastic material.

11. Apparatus as defined in claim 9, wherein the portions of said adaptor member adjacent said recess are in resiliently biased engagement with said tape module housing.

12. Apparatus as defined in claim 11, and further wherein said adaptor contains a through aperture (70) extending between the top and bottom wall surfaces thereof adjacent said recess, thereby to increase the resilient gripping effect of said adaptor member relative to said tape module housing.

13. Apparatus as defined in claim 12, and further wherein said adaptor member contains a slot extending between one end of said aperture and said recess to define a resilient bridge portion (80) for resiliently gripping said tape module housing.

14. An adaptor and miniature tape module assembly adapted for use with a tape recording and/or play-back apparatus of the cassette type having reference boss means (2) for locating a magnetic tape cassette on a support surface of the apparatus, parallel spaced capstan (6) and pinch wheel means (8) arranged normal to said support surface for transporting the cassette tape along a given path relative to said support surface, sensing head means (7) arranged adjacent said given tape path, and a pair of parallel spaced drive spindles (4) arranged parallel to said support surface, said adaptor and miniature tape module assembly comprising (a) a generally flat rectangular adaptor member having bottom, top, side and end wall surfaces, one of said side wall surfaces containing a generally rectangular recess (50);

(b) a generally rectangular hollow tape module housing having bottom, side and end walls, means for removably mounting said tape module housing in said recess with one of its side walls coincident with the said one side wall of said adaptor member, thereby to define an adaptor member and tape module assembly, the bottom wall of said module housing containing first apertures (24a, 24b) for receiving the reference boss means of the apparatus, said adaptor member containing second apertures (56a, 56b) for freely receiving in concentrically spaced relation the drive spindles of the apparatus;

(c) the end walls of said tape module housing and the corresponding walls of said recess including complementary guide means for slidably guiding said housing for displacement relative to said adaptor member in a direction normal to said one housing side wall; and (d) a length of tape (11) mounted in said tape module housing, said tape module including guide means (14, 16) for guiding said tape along a path parallel with and adjacent the inner surface of said one housing side wall;

(e) the bottom wall of said tape module housing containing a capstan aperture (22) on the side of said tape path remote from said one housing side wall, said aperture being adapted to receive the drive capstan of the apparatus;

(f) the said one side wall of said housing containing a pinch wheel opening (20) adjacent said capstan opening whereby the tape may be gripped between the pinch wheel and the drive capstan, the said one side wall of said housing also containing a sensing head opening (18) adjacent said tape path for receiving the sensing head during tape recording or playback operation of the apparatus.

* * * * *